United States Patent [19]

Dziemba

[11] 4,307,941
[45] Dec. 29, 1981

[54] ADJUSTABLE OBJECTIVE HOLDER

[76] Inventor: Peter Dziemba, Ahornweg 17, 6350 Bad Naubeim, Fed. Rep. of Germany

[21] Appl. No.: 130,258

[22] Filed: Mar. 13, 1980

[30] Foreign Application Priority Data

Jun. 20, 1979 [DE] Fed. Rep. of Germany ....... 2924739

[51] Int. Cl.³ ............................................. G02B 7/02
[52] U.S. Cl. .................................. 350/255; 74/99 R; 248/178
[58] Field of Search ........................ 350/255, 429–430, 350/247, 114–116; 354/195, 197–198, 286; 352/140; 353/76, 101; 74/96, 99 R, 99 A; 248/178, 183, 185, 585, 592

[56] References Cited

U.S. PATENT DOCUMENTS 3,486,388 12/1969 Saylor ....................................... 74/96
3,596,863 8/1971 Kaspareck ........................... 248/183

FOREIGN PATENT DOCUMENTS 2457935 8/1975 Fed. Rep. of Germany ...... 248/178

OTHER PUBLICATIONS

Kranick et al., "X-Y Stage Drive", IBM Tech. Disc. Bulletin, Sep. 1972, pp. 1107–1108.

Primary Examiner—William H. Punter
Attorney, Agent, or Firm—Michael J. Striker

[57] ABSTRACT

The adjustable objective holder for optical projectors has a focussing support formed as a single piece defining two pairs of juxtaposed walls forming a parallelogram. The walls of one pair are rigid whereas the walls in the other pair are flexible. One rigid wall is fixedly mounted to the apparatus and supports for rotation a control shaft. The opposite rigid wall has on its inner surface a control groove which engages an eccentric formed on the end of the control shaft so that during the rotation of the eccentric the flexible walls are uniformly swung and due to the parallel linkage the movable rigid wall together with the objective performs a linear movement at right angles to the transparency.

7 Claims, 4 Drawing Figures

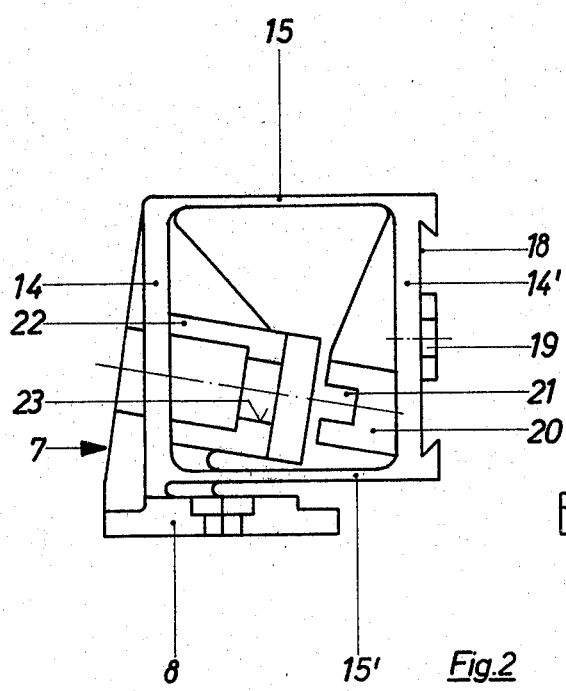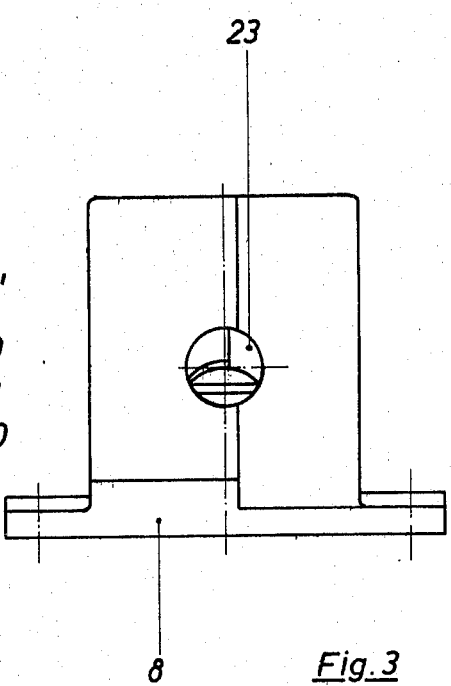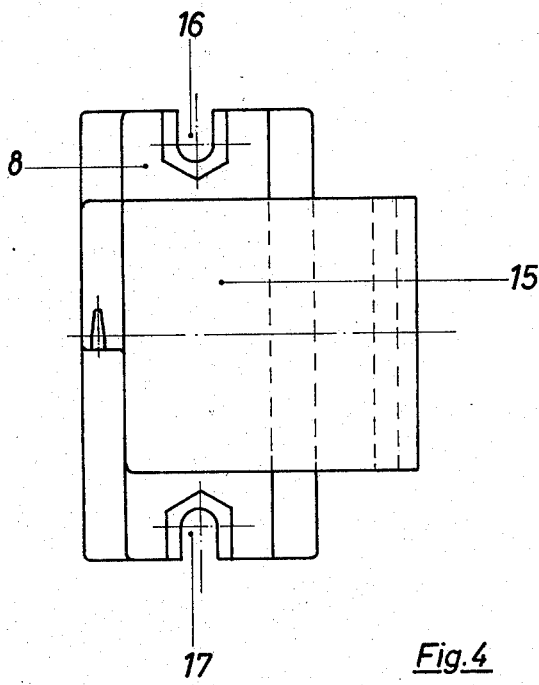

ADJUSTABLE OBJECTIVE HOLDER

BACKGROUND OF THE INVENTION

This invention relates in general to optical devices and in particular to an adjustable objective holder in such devices like microfiche readers, overhead projectors and the like in which the objective has to be displaceable at right angles to a film carrier in order to adjust a sharp focus.

The objective holders or optical devices of the aforedescribed type are generally known in the art. The construction of such holders, however, has to meet various contradicting requirements which are frequently difficult to meet. For instance to achieve a uniformly sharp projected image it is necessary that the objective be exactly displaceable at right angles to the film. Also, for the sake of a good quality of the projected image the objective holder is to be designed without any play. Inasmuch as optical devices in many cases are subject to vibrations, the objective holder has to be designed such as to prevent any unintentional displacement of the objective which would require a repeated manual readjustment of the sharp focus. In the case of microfiche readers it is frequently also desired that the objective be changeable in a simple and fast manner for another one. Furthermore, since optical apparatuses are mostly mass produced, it is of importance that in order to achieve a low price the objective holder be also inexpensive in manufacture.

Prior art optical devices only partially meet the above-mentioned requirements. For example, a conventional objective holder employs a tubular piece having an inner thread in which the objective which is provided with an outer thread is screwed. The focussing is made exactly as in a photographic camera by turning the objective in the tubular piece.

Such a known objective holder, however, requires high manufacturing tolerances and is therefore expensive to manufacture. For instance, in microfiche film readers in many cases only a small marginal area of the objective is used for the transmission of the light beam. Furthermore, the objectives used in such mass produced optical devices have not for economic reasons the same optical quality over their entire lens surface. It may happen, therefore, that in an objective which is focussed by turning, the projected light beam passes through such an area of the objective surface in which the optical quality is relatively poor.

Also known is an objective holder which axially displaces the objective lens in order to adjust the sharp focus. This arrangement has the advantage that in the case of an assymetric transmission of the light beam it is possible during the installation of the objective into the holder to select such a position or range on the objective surface which ensures the best quality of the projection. This selected range or position is not changed during the axial displacement of the objective. Conventionally, the objective holders of this kind are assembled of two sleeves of which the inner sleeve supports the objective and is provided with a groove cooperating with an excenter so that by operating the excenter by means of an adjustment shaft the inner sleeve is axially displaced. This known construction also requires an extremely high manufacturing accuracy and therefore is also expensive. Any play between the two sleeves produces optical deterioration because due to the one-sided engagement of the excenter the inner sleeve has a tendency to tilt relative to the outer sleeve.

SUMMARY OF THE INVENTION

It is, therefore, a general object of the present invention to overcome the aforementioned disadvantages.

More particularly, it is an object of the invention to provide an improved objective holder of the aforedescribed type which enables an exact focus adjustment by a nonrotational displacement move.

Another object of this invention is to provide such an objective holder which is compact in structure and unsensitive to vibrations.

Still another object of this invention is to provide such an improved objective holder which is inexpensive to manufacture.

In keeping with these objects and others which will become apparent hereafter, one feature of the invention resides in the provision of a focussing support having two pairs of juxtaposed walls forming a parallelogram; one pair of the walls being rigid and the other pair being flexible, the outer surface of one of the rigid walls including means for mounting an objective thereon and the inner surface of this one rigid wall being formed with a control groove or bore extending transversely relative to the outer surface, the other rigid wall supporting for rotation a control shaft having an eccentric end portion, the eccentric portion engaging the control bore to swing the pair of flexible walls and thus to displace the one rigid wall during the rotation of the shaft, and means for fixedly mounting the other rigid wall in the optical device.

The advantageous features of this invention result from the application of the principle of a parallel linkage such as used for example in drafting machines, in a mounting support or holder for an objective. Two parallel pairs of walls are lined together into a parallelogram to provide parallel motion of the objective supporting wall at right angles to the film carrier. When this focussing parallel linkage support is die cast as of a suitable synthetic material the manufacture is relatively simple without requiring highly accurate machining and consequently the resulting one-piece objective support of this invention enables the production of high-quality optical devices at reduced costs.

Due to the fact that the objective is displaced by means of an excenter which engages a control groove or bore in the rigid supporting wall of the focussing support, it is possible to rotate the control knob on the shaft of the excenter in both opposite directions without encountering any limit stop. The objective itself during the continuous rotation of the control eccentric performs only a straight reciprocating movement. As a consequence, the optical apparatus equipped with the objective holder of this invention is safeguarded against operational errors and cannot be damaged by improper turning of the focus control knob.

It is also of advantage that to adjust the focus of the objective only minute frictional forces are present since the objective holder operates without any guiding grooves. In spite of this easy control, there is no danger of a self-induced midadjustment of the objective inasmuch as the frictional forces in the bearing of the control shaft are sufficient to hold the objective in any of its adjusted positions. Furthermore, since the objective is held in the desired position without the use of any guiding surfaces, it cannot become jammed by thermal effects on such surfaces when the optical apparatus radiates heat during its operation. By virtue of the fact that the objective performs a straight axial displacement only without any rotational movement to attain its sharp focussing position, it is possible prior to its installation into an optical apparatus which employs assymetrical light beams, to select such a range of the objective surface which exhibits the best optical quality.

As an additional advantage of the objective holder of this invention should be mentioned also the fact that it is insensitive to vibrational effects and requires negligible setting work or expenditures during its installation in the optical apparatus. The construction of the focussing support has a low mass and by virtue of the fact that the whole focussing support can be manufactured exclusively of a suitable plastic material, it has a negligible weight and is therefore suitable particularly for portable optical devices.

In a preferred embodiment of this invention the control shaft is supported for rotation in a bearing sleeve formed in a projection extending from the inner surface of the fixed rigid wall of the support and terminating close to the control groove for the eccentric in the opposite rigid wall carrying the objective. This arrangement has the advantage that the swinging movement of the flexible walls of the support has only a negligible influence on the position of the eccentric. Accordingly, it is only the rotary movement of the eccentric which changes the sharp focus adjustment and not the pendulum-like movement of the flexible walls.

A particularly inexpensive manufacture of the objective holder of this invention will result when, according to another feature of this invention, the entire focussing support is manufactured as a single piece by injection molding of a suitable plastic material. It is also possible to employ in this injection molding process a complementary form having a configuration which eliminates any movable part of the casting die thus further reducing the manufacturing cost and ensuring a long working life.

According to still another feature of this invention, the rigid wall of the focussing support which carries the objective is shaped with a dove-tail guiding groove engaging a correspondingly shaped mounting plate of the objective. In this manner, the objective can be easily exchanged and mounted on the focussing support.

It is also advantageous when an arresting member is provided between the dove-tailed guiding surfaces of the objective in its mounting position. This arresting member determines automatically the working position of the objective and of its supporting plate relative to the dovetailed guide.

According to still another feature of this invention the whole focusing support is made of a material which is elastically deformable. Due to this elastic deformability the distance between the objective and the film carrier in any focussing position is maintained stable inasmuch as the walls exert a small bias against the eccentric and against the control shaft. In this manner any play in the objective holder of this invention is completely eliminated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a top view of the adjustable focussing support in the holder of this invention;

FIG. 3 is a side view of the support of FIG. 2; and

FIG. 4 is another side view of the support of FIG. 2.

DESCRIPTION OF THE PREFERRED EMBODIMENTS

Figure 1:
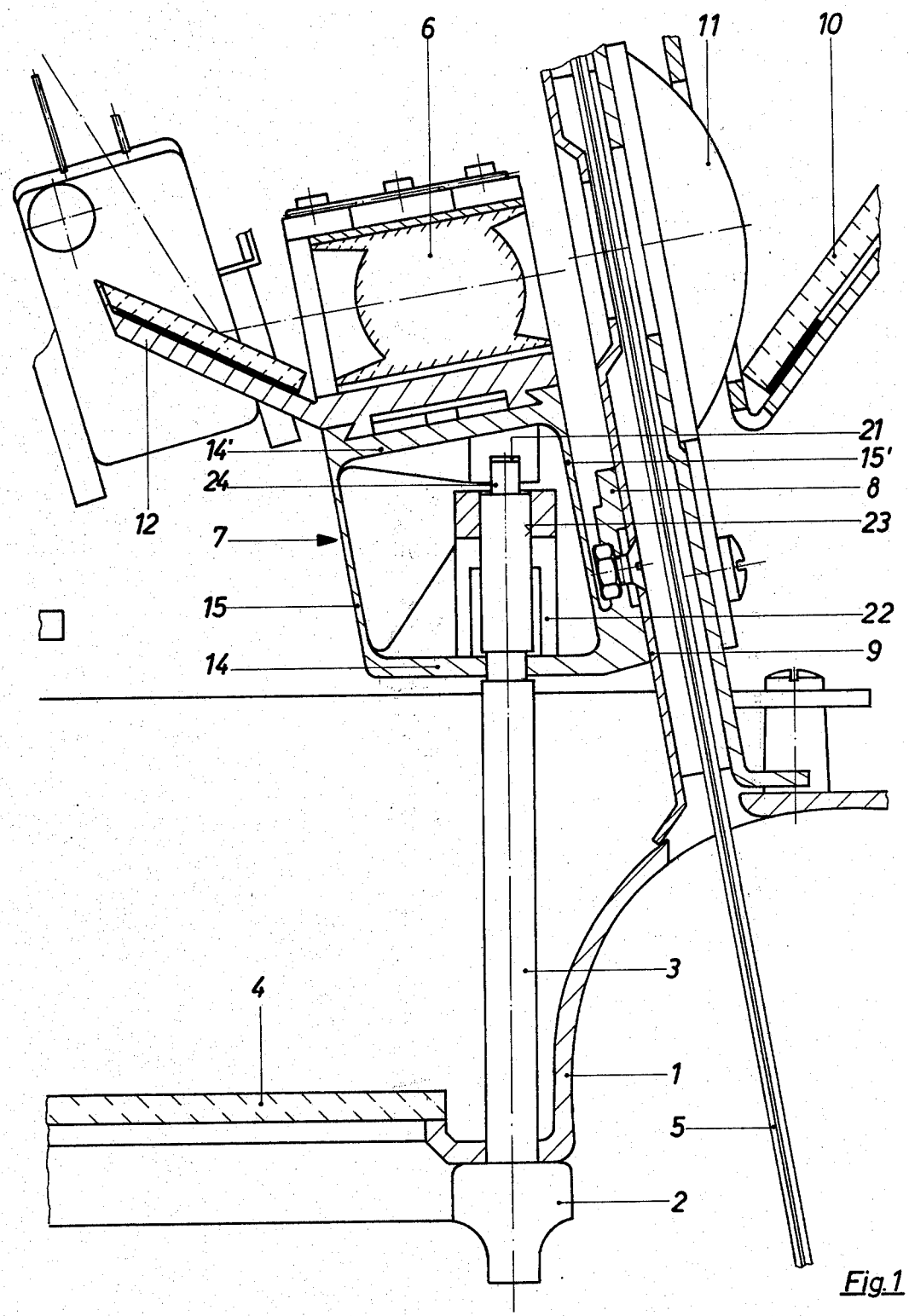
FIG. 1 is a sectional top view of a portion of a film reader including the objective holder of this invention.

Referring firstly to FIG. 1 there is illustrated a housing 1 of a microfiche film reader having its front wall provided with a screen 4 of a ground glass plate upon which the projected picture is displayed. A control knob 2 on a control shaft 3 for sharp focussing projects beside the screen 4.

A lateral wall of the housing 1 a portion of which is also illustrated in the drawing, is provided with means for guiding a film frame or casing 5 enclosing a transparent microfiche to be read. By means of nonillustrated levers the film casing is movable in two axial directions. An objective 6 mounted on a focussing support 7, serves for the projection of the light beam passing through the transparent microfiche. The focussing support 7 includes a mounting base 8 which is fastened to a metal sheet 9 secured to the housing 1 of the optical apparatus.

For the sake of clarity it should be also mentioned that the projection is effected by a light beam transmitted from non-illustrated lamp and reflected by a reflecting mirror 10 through a light condenser 11 which directs a uniform light beam through the transparent image and through the objective 6. Behind the objective 6 the light is again reflected by a reversing mirror 25 to another nonillustrated mirror from which the projected image is reflected on the screen 4.

The essential part of the objective holder of this invention is the aforementioned focussing support 7 which is illustrated also in detail in FIGS. 2 to 4. As seen from FIG. 2, the focussing support 7 has two pairs of juxtaposed walls 14, 14' and 15, 15' forming together a parallelogram. Walls 14 and 14' have a relatively large thickness whereas the other pair of walls 15 and 15' are reduced in thickness and are therefore flexible. The edge of one rigid wall 14 is integral with a mounting base 18 forming therewith a substantially right angle. This base plate 8 as seen particularly from FIG. 4 is provided with two indentations or recesses 16 and 17 for receiving fastening screws by means of which the whole objective holder is secured to the housing of the microfiche reader. The outer surface of the opposite rigid wall 14' is formed with a dove-tailed guide 18 for receiving the correspondingly shaped supporting plate 12 of the objective. An arresting member 19 is formed in the wall 14' to arrest the objective plate 12 in its working position. The inner surface of the rigid wall 14' is formed with an inwardly projecting block 20 including a control groove 21 extending parallel to the flexible walls 15 and 15'.

Also, the inner surface of the rigid wall 14 is shaped with an inwardly directed block 22 extending in close proximity to the control groove 21 and defining a through bore 23 directed against the control groove 21 and serving as a bearing sleeve for control shaft 3. The free end of the shaft 3 projects through the front wall of housing 1 and supports the control knob 2.

Referring back to FIG. 1, the inner end of shaft 3 has the form of an eccentric 24 which engages the control groove 21. By rotating the control knob 2 and thus the shaft 3, the periphery of eccentric 24 displaces the block 20 and thus causes a swinging movement of the flexible walls 15 and 15' and a corresponding movement of the rigid wall 14' which is displaced parallel to the opposite rigid wall 14. Due to the fact that flexible walls 15 and 15' are integrally linked to the stationary rigid walls 14 and 14', the latter performs a rectilinear parallel movement which changes the distance of the objective 6 from the film casing 5. The rigid walls as well as the effective flexible walls 15 and 15' have the same lengths linked together at right angles. As a consequence, the resulting parallelogram ensures that the wall 14' is axially displaced at a constant angle relative to the film in the casing.

As mentioned above, the whole focussing support 7 is produced as a single piece preferably by injection molding of a suitable plastic material.

It will be understood that each of the elements described above, or two or more together, may also find a useful application in other types of constructions differing from the types described above.

While the invention has been illustrated and described as embodied in a specific example of the objective holder, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An adjustable objective holder for use in a projecting device, comprising: a focussing support having two pairs of juxtaposed walls forming a parallelogram; one pair of said walls being rigid and the other pair of said walls being flexible; the outer surface of one of said rigid walls including means for mounting an objective thereon and the inner surface of said one rigid wall being formed with a control groove; the other rigid wall supporting for rotation a control shaft having an eccentric end portion, said eccentric portion engaging said control groove to swing said pair of flexible walls and thus to displace along a straight line said one rigid wall during the rotation of said shaft; and means for fixedly mounting said other rigid wall in said device.

2. The objective holder as defined in claim 1 wherein the inner surface of said other rigid wall is formed with a bearing block defining a through bore directed toward the control groove, at least a portion of said through bore forming the bearing sleeve for said control shaft and said bearing sleeve being located in close proximity to said control groove.

3. The objective holder as defined in claim 1 wherein said focussing support is made as a single piece of a plastic material shaped by an injection molding process.

4. The objective holder as defined in claim 1 wherein said mounting means on said outer surface of said one of said rigid walls is a dovetail guide for engaging a correspondingly shaped carrier plate for said objective.

5. The objective holder as defined in claim 4 wherein said dovetail guide includes an arresting member for locking the carrier plate for said objective in a fixed mounting position.

6. The objective holder as defined in claim 1 wherein said focussing support is made of an elastically deformable material for exerting a bias on said eccentric in any position of the latter.

7. The objective holder as defined in claim 1 wherein said means for fixedly mounting includes a mounting base integral with an edge portion of said other rigid wall.

* * * * *